(No Model.)

J. Y. PARKE.
ELECTRIC GAS BURNER.

No. 379,977. Patented Mar. 27, 1888.

Witnesses.
Jno. G. Hinkel Jr.
A. E. F. Fannmann.

Inventor.
J. Y. Parke.
by Foster & Freeman
Attorneys.

N. PETERS, Photo-Lithographer, Washington, D. C.

UNITED STATES PATENT OFFICE.

JOHN Y. PARKE, OF PHILADELPHIA, PENNSYLVANIA.

ELECTRIC GAS-BURNER.

SPECIFICATION forming part of Letters Patent No. 379,977, dated March 27, 1888.

Application filed November 25, 1887. Serial No. 256,149. (No model.)

*To all whom it may concern:*

Be it known that I, JOHN Y. PARKE, a citizen of the United States, and a resident of the city and county of Philadelphia, in the State of Pennsylvania, have invented certain new and useful Improvements in Electric Gas-Burners, of which the following is a specification.

My invention relates to electric automatic gas-burners, and has for its object to produce a simple, cheap, and effective burner that shall occupy but little space, be positive in operation, and capable of use with a single electric circuit to both open the gas-cock and ignite the gas and to turn the gas off and extinguish the flame; and to these ends my invention consists in the combination of devices and constructions, substantially as hereinafter pointed out.

Figure 1:
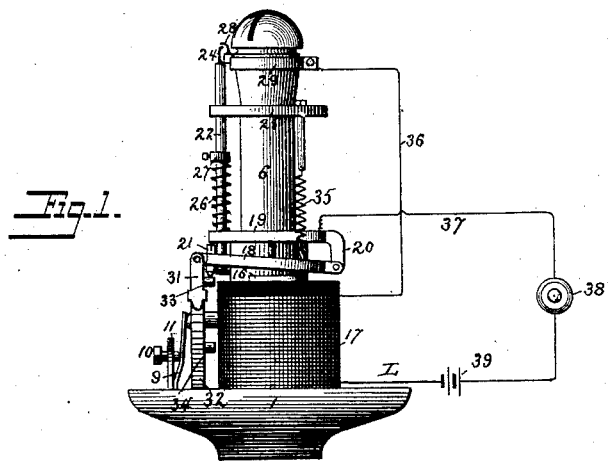
Figure 2:
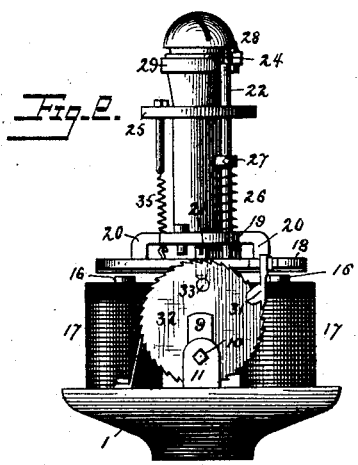
Figure 5:
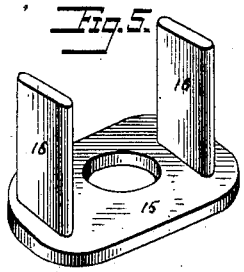
Figure 6:
Figure 4:
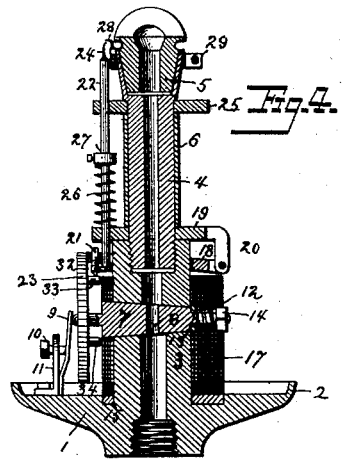
Figure 3:
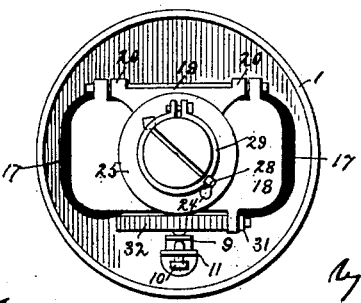

In the drawings, Figure 1 is a side elevation of a burner embodying my invention. Fig. 2 is a front elevation. Fig. 3 is a plan. Fig. 4 is a vertical section of Fig. 1, and Figs. 5 and 6 are details.

The burner consists of a suitable base-piece, 1, of any desired shape, and shown in the drawings as being circular and having an upturned rim, 2, which may serve for the reception of a suitable metal cover for the operating parts, as is usual, and in the under side is the usual tapped opening adapted to be applied to the ordinary gas-pipe fixture. Rising from the center of this base-piece is the hollow tube 3, into the end of which is fitted the extension-tube 4, and above the whole is the ordinary lava or other tip, 5, which is securely fitted into the expanded end of a sleeve, 6, which fits closely about the tube 4. Properly fitted into a tapering socket in the tube 3 is a similar-shaped plug, 7, having a passage-way, 8, and serving as a cock for regulating the flow of gas, and this plug is held in place so as to secure a tight fit and yet allow it to be freely turned by a suitable spring device which exerts a constant pressure thereon. This spring device may be variously constructed, and I have shown it in Fig. 1 as consisting of a spring-finger, 9, secured in the base 1 at one end, the other bearing against the extension of the plug and having a regulating-screw, 10, mounted in a fixed standard, 11; and in Fig. 4 I have shown a modified form in the shape of a coiled spring, 12, surrounding an extension, 13, of the plug, which is provided with an adjusting screw-nut, 14.

While I have thus described the preferred form of gas-burner, it will be understood that I do not limit my invention to the specific construction set forth, as the electrical devices which I am about to describe may be applied to other forms of burners.

Fitted into a recess in the base 1 and surrounding the tube 3 is a yoke-piece, 15, having core-pieces 16, around which the coils 17 are wound, which are connected to the line-wire L. Above this magnet is supported an armature, 18, which also surrounds the tube 3, and one end is pivoted in a suitable support, as the collar 19, having the bent edge or bracket-piece 20. This collar may be mounted on the burner in any way, and I have shown it as embracing the tube 4 and resting on the end of tube 3 and held in place by the sleeve 6. The opposite end of the armature is provided with an adjustable screw-pin, 21, preferably having a tapered end, as shown in Fig. 2, and through a hole in the armature passes the rod 22, having a head, 23, at one end, and carrying one of the electrodes, 24, at the other. This rod is supported and guided by the collar 19 and another collar, 25, also surrounding the burner, and by means of a spring, as 26, and adjusting-nut 27 is normally held in an elevated position, so that the electrode 24 is normally in contact with the electrode 28, secured upon the ring 29, which is mounted upon but insulated from the sleeve 6. Instead of mounting the second electrode, 28, on the collar 29, it may be mounted on a finger, 30, secured in and insulated from the collar 25, as shown in Fig. 6. Upon a projection of the armature is mounted a pawl, 31, which engages a ratchet-wheel, 32, secured to the plug-cock 7 and rotating therewith, and this ratchet-wheel is provided with two lugs or projections, 33 and 34, extending inward and preferably arranged in the relative positions as best shown in Fig. 2. An adjustable spring, 35, is connected to the armature for retracting it in the usual manner, and the coils 17 are connected by a wire, 36, with the collar 29 and electrodes 28 24, and the conductor 37 is connected to some part of the burner, as the collar 19, and is provided with a circuit-closer or push-button, 38, in the circuit of the battery 39.

Such being the preferred construction and arrangement of my device, the operation is as follows: Upon pressing the push-button 38 the current from the battery 39 passes through the coils 17, and by the wire 36 through the electrodes 28 24, which are normally in contact, and back to battery. This energizes the magnet and causes it to attract the armature 18, and the pawl 31 carried thereby operates upon the ratchet-wheel 32 to rotate the plug-valve 7 to open the passage-way 8 to admit the gas to the burner-tip. As the armature approaches the limit of its movement, it impinges upon the head 23 of the rod 22, carrying the electrode 24, and moves the said rod sufficiently to break the contact between the electrodes, causing a spark, which will ignite the gas if it is flowing. This breaking of the contact of course discharges the magnet and the retracting-spring 35 withdraws the armature, allowing the rod 22 to rise by means of the spring 26, and bringing the electrodes into contact again, which immediately closes the circuit, and the magnet is again energized and the same operation is repeated. This automatic operation will continue, producing a succession of sparks at the burner, until the valve 7 is turned sufficiently to open the passage-way 8, when the pin 21, carried by the armature 18, will impinge upon one of the projections, 33, which will intercept the movement of the armature and prevent its closure sufficiently to break the contact between the electrodes 24 and 28, as the armature cannot move sufficiently to strike the head 23 on the rod 22. The armature will be held in this position as long as the push-button is pressed down, closing the circuit, and as soon as the push-button is released the spring 35 will withdraw the armature to its extreme position, and the contacts will remain in this condition as long as the gas is burning.

When it is desired to extinguish the flame and turn off the gas, the push-button is again depressed and the magnet attracts the armature 18 and the pawl 31 operates upon the ratchet-wheel in advance of the pin 21 reaching the projection 33, so that by the time the pin has reached the position shown in Fig. 1 the projection has been turned sufficiently by the pawl to be out of the pathway of the pin, so that the armature may move to its full limit and operate the bar 22 to break the circuit at the electrodes, and this operation is repeated until the cock is fully turned to close the passage-way 8, when the pin 21 will impinge upon the projection 34, which has by this time assumed a position directly under the pin, and the circuit is maintained closed until the push-button is relieved.

From the above it will be seen that my improved burner can be operated positively by a single battery-circuit, and the cock may be opened and the gas ignited by one pressure, and the gas extinguished and the cock closed by another pressure upon the same button. It will further be seen that there is no danger of leaving the gas turned on, as the devices operate automatically to leave the cock either opened and the gas burning or completely closed. If, however, it is desired to turn the cock partially on only, so as to have a reduced flame, this can be done whenever the burner is in sight by a quick pressure upon the button, the duration of the pressure being readily learned by a little practice.

While I have thus described the principle of my invention and what I consider the best means for carrying it out, it will be understood that I do not limit myself to the construction and arrangement of parts shown, as they may be varied by those skilled in the art without departing from the principles of my invention.

What I claim is—

1. In an automatic electric gas-burner, the combination of a magnet, an armature therefor, a valve operated by the armature to open and close the same, a spark device, also operated by the armature to break the circuit, and a single electric circuit including a push-button and spark device, the arrangement being such that the valve is automatically opened and closed by the same push-button and the circuit is broken only at the tip, substantially as described.

2. The combination of a magnet, an armature therefor, a valve operated by the armature, a spark device, a mechanical stop for the armature arranged to stop the movement thereof when the valve is fully opened or closed, and a single electric circuit including the magnet and spark device, substantially as described.

3. The combination of the magnet, armature therefor, a valve operated by the armature, a spark device, also operated by the armature, a stop on the armature to prevent the operation of the device, and a single electric circuit, substantially as described.

4. The combination of a magnet, an armature therefor, a valve operated by the armature, a mechanical stop for the armature operated in connection with the valve, a spark device, also operated by the armature, and a single electric circuit, substantially as described.

5. The combination, with the magnet, of an armature carrying a pawl, a ratchet-wheel connected to the valve and operated by the pawl, and mechanical stops carried by the ratchet-wheel and arranged to prevent the closure of the armature at certain predetermined points, substantially as described.

6. The combination of the magnet, an armature therefor carrying a pawl, a valve carrying a ratchet-wheel operated by the pawl, stops arranged on said ratchet-wheel, and an adjustable pin carried by the armature and arranged to impinge upon said stop at predetermined positions of the valve, substantially as described.

7. The combination of the magnet, an armature therefor, and a spark device having a spring-actuated rod extending through the armature and provided with a head arranged to be struck by the armature when vibrated to the full extent of its movement, substantially as described.

8. The combination of the magnet, the armature therefor carrying a pawl, a ratchet-wheel connected with the valve and operated by the pawl, stops on the ratchet-wheel, an adjustable pin on the armature, a spark device having a spring-actuated rod passing through the armature and having a head arranged to be struck by the armature, and a single electric circuit for operating said devices, substantially as described.

9. The combination, with a gas-burner, of a magnet embracing the burner, an armature for the magnet, also embracing the burner, a valve operated by the armature, and a spark device, also controlled by the armature, substantially as described.

10. The combination, with a gas-burner having an extended base with projecting flange and recessed to receive the yoke, of an electro-magnet embracing the burner, an armature, also embracing the burner, a collar supporting the armature, and a valve operated by said armature, substantially as described.

11. The combination of a burner consisting, essentially, of a tube provided with a plug-valve, another tube connected therewith, a sleeve embracing said latter tube and supporting the burner-tip, a magnet embracing the burner, and an armature therefor pivoted in the collar supported on said burner, substantially as described.

12. The combination of a magnet, an armature therefor, a valve having a ratchet-wheel operated by the armature, stops carried by the ratchet-wheel, pin carried by the armature, and a retracting-spring for the armature, the arrangement being such that the stops will operate to prevent the complete movement of the armature at predetermined points and the pawl will operate the ratchet-wheel to move the stops out of position on the next movement of the armature, substantially as described.

In testimony whereof I have signed my name to this specification in the presence of two subscribing witnesses.

JOHN Y. PARKE.

Witnesses:
WM. A. REDDING,
N. C. LANE.